(12) United States Patent
Keating

(10) Patent No.: US 10,815,159 B2
(45) Date of Patent: Oct. 27, 2020

(54) NUTRIENT SYSTEM

(71) Applicant: BIOCARB PTY LTD, Forrestdale (AU)

(72) Inventor: Peter James Keating, Serpentine (AU)

(73) Assignee: BIOCARB PTY LTD, Forrestdale (AU)

( * ) Notice: Subject to any disclaimer, the term of this patent is extended or adjusted under 35 U.S.C. 154(b) by 30 days.

(21) Appl. No.: 15/573,649

(22) PCT Filed: May 10, 2016

(86) PCT No.: PCT/AU2016/000157
§ 371 (c)(1),
(2) Date: Nov. 13, 2017

(87) PCT Pub. No.: WO2016/179633
PCT Pub. Date: Nov. 17, 2016

(65) Prior Publication Data
US 2018/0105475 A1    Apr. 19, 2018

(30) Foreign Application Priority Data

May 13, 2015  (AU) ................................ 2015901731

(51) Int. Cl.
*C05D 5/00* (2006.01)
*C05C 5/02* (2006.01)
*C05C 5/00* (2006.01)
*A01G 31/00* (2018.01)
*C05C 7/00* (2006.01)
(Continued)

(52) U.S. Cl.
CPC .............. *C05D 5/00* (2013.01); *A01G 31/00* (2013.01); *C05C 5/00* (2013.01); *C05C 5/02* (2013.01); *C05C 5/04* (2013.01); *C05C 7/00* (2013.01); *C05D 1/00* (2013.01); *A01G 2031/006* (2013.01)

(58) Field of Classification Search
CPC .... C05D 5/00; C05C 5/04; C05C 7/00; C05C 5/02; C05C 5/00; C05C 1/00; A01G 31/10; A01G 2031/006
See application file for complete search history.

(56) References Cited

U.S. PATENT DOCUMENTS 3,197,302 A    7/1965  MacBride
5,285,595 A    2/1994  Shirato
(Continued)

FOREIGN PATENT DOCUMENTS

CN    104211499 A    12/2014

OTHER PUBLICATIONS

Gale, Hoyt Stoddard. Nitrate deposits. No. 523-524. US Government Printing Office, 1912.*
(Continued)

*Primary Examiner* — Jennifer A Smith
(74) *Attorney, Agent, or Firm* — Marshall, Gerstein & Borun LLP

(57) ABSTRACT

An alternative salt nutrient mixture for plant growth, wherein one or more of the following nutrients is present as a carbonate: nitrogen (eg ammonium), potassium, calcium, magnesium, iron, manganese, boron, zinc or copper and/or one or more of the following nutrients is present as a nitrate: nitrogen (eg ammonium), potassium, calcium, magnesium, iron, manganese, boron, zinc or copper.

3 Claims, 11 Drawing Sheets

(51) Int. Cl.
*C05C 5/04* (2006.01)
*C05D 1/00* (2006.01)

(56) References Cited

U.S. PATENT DOCUMENTS 5,433,766 A 7/1995 Ming et al.
5,549,729 A * 8/1996 Yamashita ............... A01C 1/06
71/11

OTHER PUBLICATIONS

General Hydroponics. "FloraGro 2-1-6 1 Quart Label". <http://gh.growgh.com/docs/LABELS/floragro.pdf> Feb. 22, 2016.*
ILGM Grow Guru—Dumme "DIY your own name brand nutrients" <https://support.ilovegrowingmarijuana.com/t/diy-your-own-name-brand-nutrients/6140> Jun. 2016.*
Amazon. "General Hydroponics FloraGro 1 Quart" by General Hydroponics. pp. 1-9. Nov. 7, 2009.*
General Hydroponics, Material Safety Data Sheet FloraGro (2013).
International Preliminary Report on Patentability, PCT/AU2016/000157 (dated Nov. 14, 2017).
International Search Report and Written Opinion, PCT/AU2016/000157 (dated Jul. 18, 2016).

* cited by examiner

NUTRIENT SYSTEM

TECHNICAL FIELD

The present invention relates generally to the use of dissolved carbon dioxide for increased plant growth and/or crop production and to plant growth solutions comprising an alternative salt nutrient mixture.

BACKGROUND ART

In order both to speed up the growth process of plants and to provide a year round supply for the consumer, many vegetables are grown either completely or partially isolated from the outside environment, for example in greenhouses and glasshouses. The conditions under which the plants are grown can thereby be closely regulated and parameters such as temperature, water, nutrient make-up light etc. carefully controlled.

Many greenhouses and glasshouses use a closed system such as hydroponics, particularly recirculating hydroponics systems, to enhance plant growth. In recirculating hydroponic systems, especially those that use very pure water produced by reverse osmosis, nutrients such as potassium, sodium, molybdenum, phosphate, nitrate, etc. are usually applied dissolved in the water. Although this can be carefully controlled, it is inevitably necessary to release some water from the system, principally to remove excess nutrients and restore nutrient balance. This leads to a requirement to discharge part of the nutrient system to waste. Generally, sulfates are present in superfluity in such excess water, due to the nature of the nutrients provided in hydroponic systems.

Traditionally, the excess nutrient laden water is discharged to the environment. However, discharge of water into the environment has become an unfavorable option, due to the adverse environmental impacts of water release. Adverse environmental impacts include eutrophication of waterways due to dissolved nutrients and the effect of dissolved pesticides. The discharge of excess water from a recirculating hydroponic system also results in the wastage of valuable dissolved nutrients.

Alternatively, the water in the recirculating hydroponic system may be treated to remove the nutrients. However, this is an expensive exercise in both equipment and energy costs.

A reduction in the need to release excess nutrient water would generally have the advantages of: reducing the need to purify large amounts of water for introduction into the hydroponics system; conserving precious fresh water supplies; limiting the environmental impacts of nutrient and pesticide, release; and/or costs savings from retaining expensive nutrients.

The rate of photosynthesis in plants, and thus the rate of plant growth and productivity, is determined by a number of variables, including temperature, water availability, mineral nutrient availability, light intensity and carbon dioxide concentration within chloroplasts. Under intensive horticulture conditions, such as in greenhouses and glasshouses, variables which influence the rate of photosynthesis can be precisely controlled. When light intensity is high, plant growth is accelerated by the introduction of carbon dioxide into greenhouses and glasshouses. The introduction of increased atmospheric carbon dioxide causes morphological changes in the plants, resulting in thicker and darker leaves, and a change in the proportionality between vegetative growth and fruit production.

However, the application of carbon dioxide to the atmosphere of greenhouses and glasshouses requires that such structures are made relatively airtight, as otherwise such applied carbon dioxide would be lost to the atmosphere. This increases the costs associated with greenhouse running and maintenance.

Alternative growth systems include fertigation wherein fertilizers, soil amendments, or other water-soluble products are applied to a matrix (such as soil) through an irrigation system; and traditional crops growing in open fields and pastures. These alternative systems for plant growth would also benefit from the input of controlled nutrients and additional carbon dioxide.

The above discussion of the background art is intended to facilitate an understanding of the present invention only. The discussion is not an acknowledgement or admission that any of the material referred to is or was part of the common general knowledge as at the priority date of the application.

SUMMARY OF INVENTION

There is provided an alternative salt nutrient mixture for plant growth wherein one or more of the following nutrients: nitrogen (eg ammonium), potassium, calcium, magnesium, iron, manganese, boron, zinc or copper is present as a carbonate. Preferably, the alternative salt nutrient mixture provides one or more of the following nutrients as a carbonate: nitrogen (eg ammonium), magnesium, potassium, manganese, zinc or copper. Most preferably, the alternative salt nutrient mixture comprises magnesium and/or potassium as a carbonate.

There is also provided an alternative salt nutrient mixture for plant growth wherein one or more of the following nutrients: nitrogen (eg ammonium), potassium, calcium, magnesium, iron, manganese, boron, zinc or copper is present as a nitrate. Preferably, the alternative salt nutrient mixture provides one or more of the following nutrients as a nitrate: nitrogen (eg ammonium), magnesium, potassium, manganese, zinc or copper. Most preferably, the alternative salt nutrient mixture comprises magnesium as a nitrate.

The present invention further provides a plant growth solution comprising (i) an alternative salt nutrient mixture comprising: potassium carbonate, magnesium nitrate and (ii) dissolved carbon dioxide. The dissolved carbon dioxide may be dissolved in an aqueous carrier such as water or a recirculating nutrient solution.

Preferably, the plant growth solution is used in a closed watering system such as a hydroponics system, a semi-closed watering system such as ferticulture system or an open watering system such as the irrigation or spray watering of an open field or broad acre field. Preferably, the plant growth solution used in the watering system further contains dissolved carbon dioxide.

The invention further provides a closed, semi-closed or open watering system for the growth of plants, the closed, semi-closed or open watering system comprising a plant growth solution comprising an alternative salt nutrient mixture, wherein one or more of the following nutrients: nitrogen (eg ammonium), potassium, calcium, magnesium, iron, manganese, boron, zinc or copper is present as a carbonate and/or one or more of the following nutrients: nitrogen (eg ammonium), potassium, calcium, magnesium, iron, manganese, boron, zinc or copper is present as a nitrate.

The invention provides method of increasing the carbon dioxide available for plant growth comprising the steps of:

a) providing a plant growth solution comprising an alternative salt nutrient wherein one or more of the following nutrients is present as a carbonate: nitrogen (eg ammonium), potassium, calcium, magnesium, iron, manganese, boron, zinc or copper and/or one or more of the following nutrients is present as a nitrate: nitrogen (eg ammonium), potassium, calcium, magnesium, iron, manganese, boron, zinc or copper; and b) dissolving carbon dioxide in the plant growth solution.

The present invention further provides a method for growing plants wherein the method comprises administering a plant growth solution comprising an alternative salt nutrient mixture wherein one or more of the following nutrients: nitrogen (eg ammonium), potassium, calcium, magnesium, iron, manganese, boron, zinc or copper is present as a carbonate and/or one or more of the following nutrients: nitrogen (eg ammonium), potassium, calcium, magnesium, iron, manganese, boron, zinc or copper is present as a nitrate.

BRIEF DESCRIPTION OF THE DRAWINGS

The description will be made with reference to the accompanying drawings in which.

DESCRIPTION OF THE INVENTION

Detailed Description of the Invention

Figure 1:
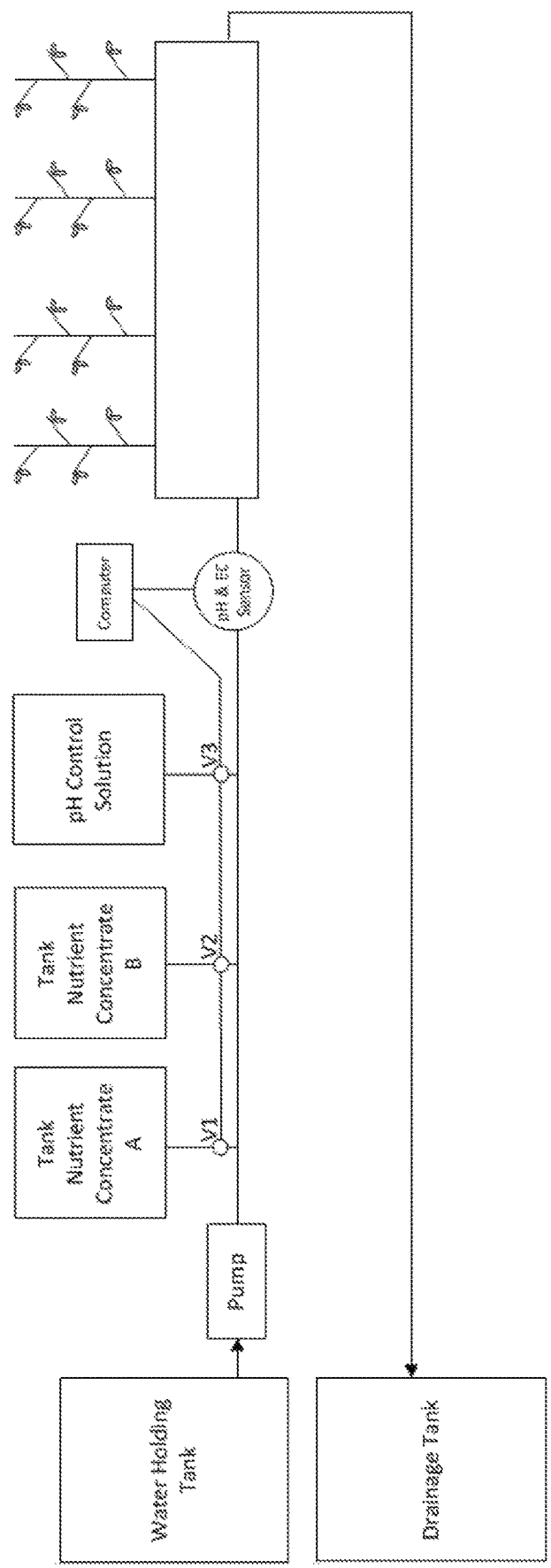
FIG. 1 is a schematic drawing of a typical hydroponic plant production system. Water is drawn from a holding tank and pumped into a delivery pipe. Separate tanks contain concentrated nutrient solutions which are introduced into the delivery pipe at a controlled rate. Typically, a sensor in the delivery pipe measures electrical conductivity, and the rate of introduction of concentrated nutrient solutions is controlled by valves 1 and 2 to achieve a specific electrical conductivity. Typically, another sensor in the delivery pipe measures solution pH; and the rate of the introduction of an acid, such as phosphoric acid, or an alkali solution such as potassium, hydroxide is controlled by valve 3 to achieve a specific pH.
Figure 2:
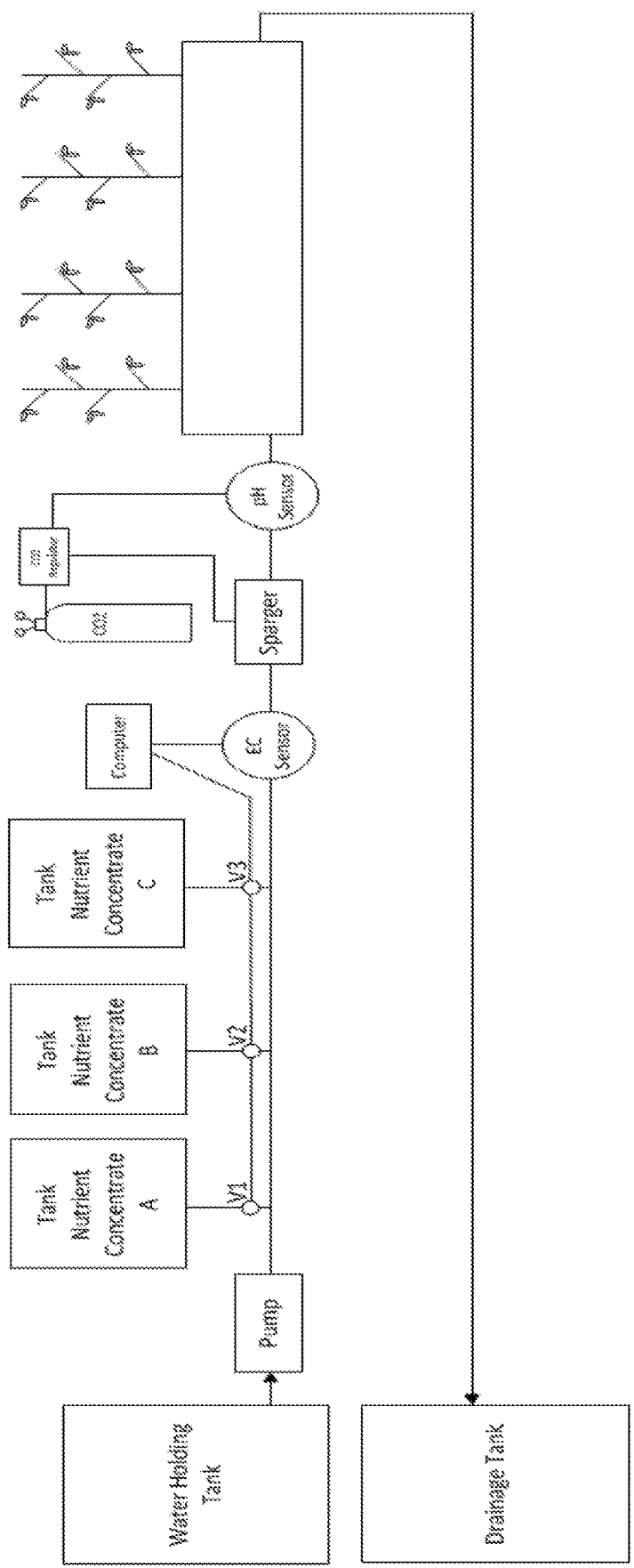
FIG. 2 is a schematic drawing of a hydroponic plant production system using a three part alternative salt nutrient mixture according to the present invention to form a plant growth solution. Water is drawn from a holding tank and pumped into a delivery pipe. Separate tanks contain concentrated alternative salt nutrient solutions according to the present invention which are introduced into the delivery pipe at a controlled rate. A sensor in the delivery pipe measures electrical conductivity, and the rate of introduction of concentrated nutrient solution is controlled by valves 1, 2 and 3 to achieve a specific electrical conductivity. Another sensor in the delivery pipe measures solution pH, and the rate of the introduction of carbon dioxide gas is controlled to achieve a specific pH.
Figure 3:
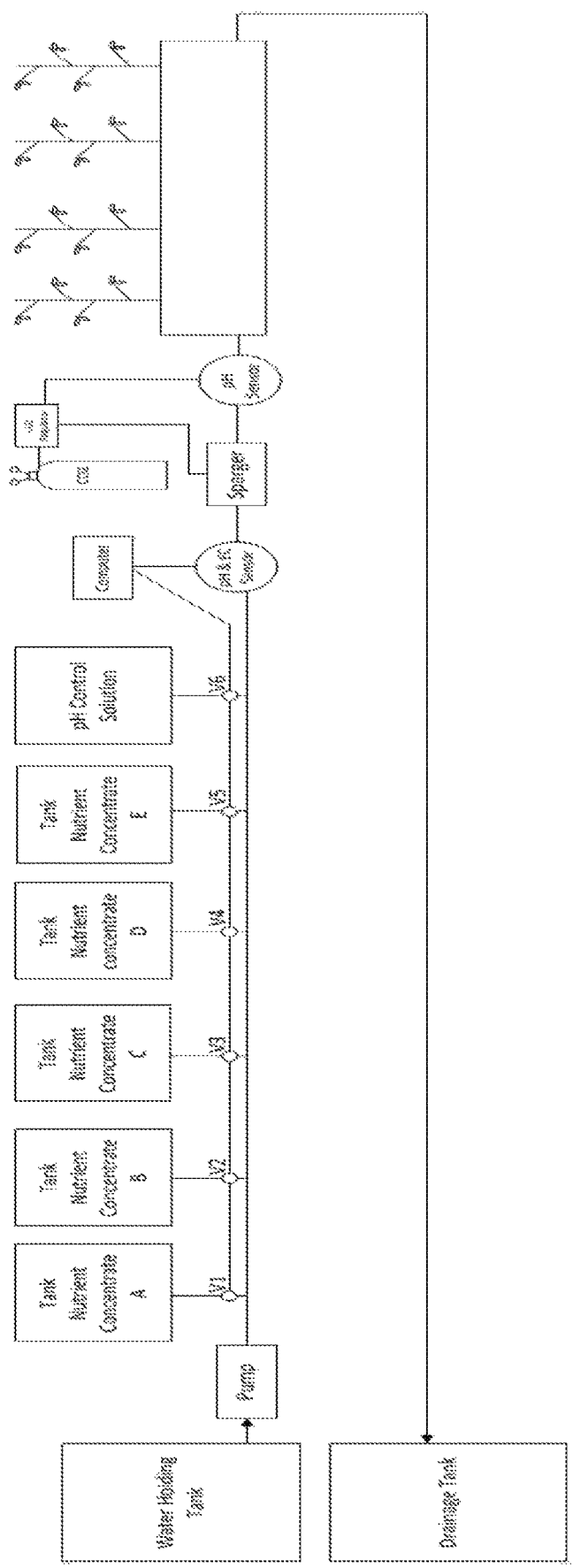
FIG. 3 is a schematic drawing of another embodiment of a hydroponic plant production system using a six part nutrient system combining typical nutrient mixes as in FIG. 1 with an alternative salt nutrient mixture according to the present invention. Water is drawn from a holding tank and pumped into a delivery pipe. Separate tanks contain concentrated alternative salt nutrient solutions according to the present invention in Tanks A, B and C, whereas typical nutrient solutions are contained in Tanks D and E and pH adjustment mixture in Tank F. Any combination of nutrient concentrate mixtures are introduced into the delivery pipe at a controlled rate. The grower can select at any time the amount of carbon dioxide growth promotion which is best at that particular time and stage of crop development. If the grower chooses not to use carbon dioxide enhancement, the system is operated in a manner similar to FIG. 1 by delivering, nutrient concentrates from Tanks D and E and pH adjustment from Tank F. If the grower chooses to use full carbon dioxide enhancement, the system is operated in a manner similar to FIG. 2 by using Tanks A, B and C and adjusting pH by the introduction of carbon dioxide. The grower can vary the amount of carbon dioxide enhancement by varying the proportion of nutrients delivered from Tanks A, B and C and those delivered from Tanks D, E and F.

A typical plant growth nutrient mixture, known to plant growers for many years, may comprise the following nutrients:

TABLE 1

Two part typical nutrient mixture

| Part A | Part B |
| --- | --- |
| Calcium ammonium nitrate | Potassium nitrate |
| Potassium nitrate | Monopotassium phosphate |
| Ferric EDTA | Magnesium sulphate |
| Boric acid | Potassium sulphate |
|  | Ammonium nitrate |
|  | Manganese sulphate |
|  | Zinc sulphate |
|  | Sodium molybdate |
|  | Copper sulphate |

The components of Part A and Part B are dissolved in separate containers in water. When needed for plant growth, such as in a hydroponics watering system, the two Parts are mixed in an aqueous carrier such as water or recirculating nutrient solution to form the plant growth solution used in the watering system. A typical nutrient mixture has the major and trace nutrient elements required for healthy productive plant growth. However, due to the use of sulphate salts, sulphate is in excess of the requirements of healthy plants. Sulphate salts are generally used due to their low cost and ability to maintain nutrient mixtures containing sulphates near to the optimal pH for plant growth, including hydroponic plant growth.

Alternative Salt Nutrient Mixture

In contrast to typical nutrient mixtures, the present invention provides an alternative salt nutrient mixture for a plant growth solution, wherein the nutrients typically provided in the form of sulphates are instead provided at least partly in the form of other mineral salts. Preferably, the mineral salts are carbonates and/or nitrates. The presence of the nutrients in the form of other mineral salts will then allow the introduction of inorganic carbon into a plant growth solution made using the alternative salt nutrient mixture, via the use of dissolved carbon dioxide.

The plant growth solution of the present invention comprising an alternative salt nutrient mixture of the present invention (that may be provided in two or more parts), may be dissolved in an aqueous carrier such as water or a recirculating nutrient solution. The plant growth solution may then be used in a watering system such as a closed watering system, a semi-closed watering system or an open watering system. Inorganic carbon is preferably introduced into the plant growth solution via the use of carbonate salts and by dissolving gaseous carbon dioxide in the plant growth solution.

By dissolving carbon dioxide in the plant growth solution comprising the alternative salt nutrient mixture, plant growth is stimulated. Such dissolution requires amendment to the typical nutrient mixture (which is specifically optimised for different plant species) in order to maintain an optimal pH for nutrient dissolution, uptake by plants and plant growth, as the dissolved carbon dioxide forms carbonic acid, bicarbonate and carbonate ions in proportions determined by the specific salt nutrient concentrations and the pH.

Previously, it was not believed that such modifications to a plant growth solution to introduce dissolved carbon dioxide could be made due to the insoluble nature of many carbonate salts, precipitation of which leads to both imbalances in the nutrients available to the plants and clogging of recirculation and spraying equipment. Furthermore, the use of dissolved carbon dioxide was not considered advantageous as the carbonic acid reduces the pH to levels at which plant growth may be compromised.

Whilst carbon dioxide is traditionally considered to rate limit photosynthesis only when lower order rate limits (temperature, water availability, nutrient availability, light intensity) are saturated or near saturated, we have surprisingly found that increased growth can be obtained under a variety of conditions by increasing the amount of carbon dioxide available to the plant's roots. Thus, whilst plant growth in closed watering systems such as greenhouses is traditionally controlled by modifying temperature, light intensity, water and nutrient availability, and in field and "semi-open" watering systems by modifying, water and nutrient availability, the present invention provides a further source of plant growth control based on increased carbon availability through increased carbon delivery to plant roots via the addition of carbon dioxide gas to a modified plant growth solution containing an alternative salt nutrient mixture, wherein the nutrients typically provided in the form of sulphates are instead mostly provided in the form of other mineral salts.

Without being held to any specific theory, we believe that the growth promotion resulting from the plant growth solution of the present invention derives from the nature of the Ru bisco enzyme (Ribulose-1,5-bisphosphate carboxylase/oxygenase, commonly known by the abbreviation RuBisCO. The ruibisco enzyme is a carboxylase when carbon dioxide concentration is high, and an oxygenase when carbon dioxide concentration is low. In conditions of high carbon dioxide, two molecules of 3-phosphoglycerate (PGA) are produced from ribulose-1,5-bisphosphate, whereas in conditions of high oxygen, only one PGA molecule is produced, as well as one molecule of phosphoglycolic acid. The phosphoglycolic acid cannot participate in the Calvin cycle to form sugar, but instead is involved in photorespiration. Photosynthetic efficiency (the amount of sugar formed from each unit of light energy absorbed) thus drops when carbon dioxide concentration is lowered. Therefore, if the carbon dioxide concentration a plant is exposed to can be increased, the photosynthetic efficiency will increase.

The present invention provides an easily deliverable and controllable carbon dioxide source, in the form of (i) a plant growth solution comprising an alternative salt nutrient mixture comprising nutrients mostly provided in the form of salts other than sulphate, and (ii) dissolved carbon dioxide. The plant growth solution comprising an alternative salt nutrient mixture and dissolved carbon dioxide will increase the production of sugar by photosynthesis and thus increase plant growth.

There is therefore provided an alternative salt nutrient mixture wherein one or more of the following nutrients: nitrogen (eg ammonium), potassium, calcium, magnesium, iron, manganese, boron, zinc or copper is present as a carbonate. Preferably, the alternative salt nutrient mixture provides one or more of the following nutrients as a carbonate: magnesium, potassium, manganese, zinc or copper. Most preferably, the alternative salt nutrient mixture comprises magnesium and/or potassium as a carbonate.

There is also provided an alternative salt nutrient mixture wherein one or more of the following nutrients: nitrogen (eg ammonium), potassium, calcium, magnesium, iron, manganese, boron, zinc or copper is present as a nitrate. Preferably, the alternative salt nutrient mixture provides one or more of the following nutrients as a nitrate: magnesium, potassium, manganese, zinc or copper. Most preferably, the alternative salt nutrient mixture comprises magnesium as a nitrate.

Previously, it was thought that it was not possible to provide nutrients in the form of carbonates, as the presence of carbonates affects the pH of the solution and carbonate salts of many cations are generally less soluble than the equivalent sulphate salts. For example calcium carbonate and magnesium carbonate are relatively insoluble, as are copper and zinc carbonates.

The present invention preferably provides an alternative salt nutrient mixture for plant growth comprising potassium carbonate and magnesium nitrate.

Preferably, all of the nutrients are provided in the same stoichiometric ratios as they would be provided in a typical nutrient mixture for a watering system such as a closed watering system (eg, a hydroponics watering system). The precise stoichiometric ratios of the individual nutrients in a typical nutrient mixture differ and are optimised depending on the type of plant being grown in the hydroponics solution. Each different plant or crop type has differing requirements for the nutrients in a typical nutrient mixture. However, those skilled in the art are well aware of the preferred conditions and optimal nutrient mixtures for each plant and crop type and are well able to determine the stoichiometric ratios to convert, for example, a known hydroponics typical nutrient mixture from the typical formula to the presently claimed alternative salt nutrient mixture. Therefore, for example, all or part of the potassium sulphate may be substituted with a stoichiometric equivalent of potassium carbonate and/or all or part of the magnesium sulphate may be substituted with a stoichiometric equivalent of magnesium nitrate.

Preferably, the alternative salt nutrient mixture of the present invention is made up of one or more of the following nutrients: calcium ammonium nitrate; potassium nitrate; ferric EDTA; boric acid; potassium nitrate, monopotassium phosphate; monoammonium phosphate, phosphoric acid, magnesium nitrate; magnesium sulphate, potassium sulphate, potassium carbonate; ammonium nitrate; manganese sulphate; zinc sulphate; sodium molybdate; and copper sulphate.

The alternative salt nutrient mixture may be provided in two parts, as follows:

TABLE 2

Two part alternative salt nutrient mixture

| Part A | Part B |
| --- | --- |
| Calcium ammonium nitrate | Potassium nitrate |
| Potassium nitrate | Monopotassium phosphate |
| Ferric EDTA | Magnesium nitrate |
| Boric acid | Potassium carbonate |
|  | Ammonium nitrate |
|  | Manganese sulphate |
|  | Zinc sulphate |
|  | Sodium molybdate |
|  | Copper sulphate |

The amount of potassium nitrate used in Part A or Part B may be reduced in proportion to the increase in nitrate from the use of magnesium nitrate instead of magnesium sulphate and the increase in potassium from the use of potassium carbonate.

Potassium carbonate forms an alkaline solution on dissolution in an aqueous carrier. In a typical nutrient mixture, the addition of potassium carbonate would cause precipitation of relatively insoluble carbonate salts such as magnesium carbonate. However, by dissolving carbon dioxide into the alternative salt nutrient mixture of the present invention, a significant reduction in pH is achieved. The pH of a Part B solution of the presently claimed alternative salt nutrient mixture can be lowered by dissolving carbon dioxide in the mixture, thereby rendering the carbonate salts into the more soluble bicarbonate form. As an alternative to enable the use of carbon dioxide in a plant growth solution comprising an alternative salt nutrient mixture, the potassium carbonate may be dissolved by itself in a third solution termed Part C. Preferably, the Part C containing potassium carbonate is added to the plant growth solution last and immediately before dissolving carbon dioxide gas in the plant growth solution. Alternatively, the carbon dioxide can be dissolved in the potassium carbonate solution (Part C) before the three Parts are mixed with an aqueous carrier to form the plant growth solution.

Therefore, the alternative salt nutrient mixture may be provided in three parts, as follows:

TABLE 3

Three part alternative salt nutrient mixture

| Part A | Part B | Part C |
| --- | --- | --- |
| Calcium ammonium nitrate | Potassium nitrate | Potassium carbonate |
| Potassium nitrate | Monopotassium phosphate |  |
| Ferric EDTA | Magnesium nitrate |  |
| Boric acid | Ammonium nitrate |  |
|  | Manganese sulphate |  |
|  | Zinc sulphate |  |
|  | Sodium molybdate |  |
|  | Copper sulphate |  |

The Part A and Part B (and Part C) components of the alternative salt nutrient mixture may be dissolved in separate containers in water. When needed for a plant growth solution, the Parts may be mixed with an aqueous carrier such as water or recirculating nutrient solution to form a plant growth solution containing the optimal proportions of nutrients for plant growth.

For each plant type grown in the presence of the plant growth solution comprising an alternative salt nutrient mixture, the alternative salt nutrient mixture of the present invention has the major nutrient elements nitrogen, potassium, phosphorous, calcium, magnesium, sulphur; and the trace elements iron, manganese, boron, zinc, copper and molybdenum present in the alternative salt nutrient mixture in the same proportion as is present in dried leaf tissue of healthy plants.

Examples of suitable alternative salt nutrient mixtures of the present invention for different crops are provided in Table 4. The components of conventional typical nutrient mixtures are provided ("Typical"), alongside example alternative salt nutrient mixtures of the present invention ("CO$_2$"). The alternative salt nutrient mixtures of the present invention have equivalent ratios of nutrients using potassium carbonate and magnesium nitrate. Each of these formulations also has six trace elements added as minor components: however, the ratio of these doesn't change substantially in the alternative salt nutrient mixtures of the present invention.

TABLE 4

Components of Nutrient mixtures

| Component (g/L) | Brassica Typical | Brassica CO$_2$ | Tomato Typical | Tomato CO$_2$ | Coriander Typical | Coriander CO$_2$ | Capsicum Typical | Capsicum CO$_2$ | Lettuce Typical | Lettuce CO$_2$ |
|---|---|---|---|---|---|---|---|---|---|---|
| Calcium Nitrate | 250 | 250 | 150 | 150 | 150 | 150 | 188 | 188 | 150 | 150 |
| Potassium Nitrate | 90 | 55 | 172 | 105 | 120 | 77 | 184 | 167 | 60 | 31 |
| Ammonium Nitrate | 12 | 12 | 39 | 39 | 12.5 | 12.5 | 0 | 0 | 18 | 18 |
| Monopotassium Phosphate | 33 | 33 | 73 | 73 | 30 | 30 | 40 | 40 | 45 | 45 |
| Magnesium Sulphate | 100 | 60 | 130 | 70 | 100 | 53 | 90 | 70 | 85 | 45 |
| Potassium carbonate | 0 | 23 | 0 | 53 | 0 | 61 | 0 | 40 | 0 | 67 |
| Potassium Sulphate | 20 | 0 | 10.4 | 0 | 42.5 | 0 | 40 | 0 | 55 | 0 |
| Magnesium Nitrate | 0 | 40 | 0 | 63 | 0 | 52 | 0 | 23 | 0 | 40 |

The present invention thus provides an alternative salt nutrient mixture comprising one or more of the following nutrients at the following ranges: calcium nitrate at 130-280 g/L, potassium nitrate at 20-200 g/L, ammonium nitrate at 10-50 g/L, monopotassium phosphate at 20-80 g/L, magnesium sulphate at 20-150 g/L, potassium carbonate at 1-250 g/L, magnesium nitrate at 30-100 g/L. More preferably, the alternative salt nutrient mixture comprises potassium carbonate at 1-250 g/L and/or magnesium nitrate at 30-100 g/L. The alternative salt nutrient mixture preferably comprises potassium carbonate at 1-250 and magnesium nitrate at 30-100 g/L.

It is clear to those familiar with the art that a similar composition of nutrient elements can be achieved using alternative mineral salts.

There are a number of alternative methods of dissolving carbon dioxide, carbonate and bicarbonate salts into a plant growth solution:
- carbon dioxide can be dissolved in fresh water prior to adding nutrients;
- in nstances where plant growth solution comprising alternative salt nutrient mixtures are captured in drains and recirculated for re-use, carbon dioxide can be dissolved in the recirculated water prior to reuse and before adjusting nutrient levels;
- carbon dioxide can be dissolved in the potassium carbonate solution (Part C) whereupon the pH of Part C will reduce and it will become an equilibrium mixture of potassium carbonate and potassium bicarbonate;
- carbon dioxide can be dissolved into the plant growth solution after Parts A, B and C are added before it is applied to plants.

The amount of total inorganic carbon in the plant growth solution can also be changed by increasing or decreasing the amount of potassium carbonate introduced into the plant growth solution (for example in Part C of the alternative salt nutrient mixture), and correspondingly changing the amount of carbon dioxide gas required to keep the plant growth solution in the watering system at optimal pH.

The present invention thus provides a flexible method to directly and easily control the amount of and form of inorganic carbon within the plant growth solution and the amount of inorganic carbon that is applied to plants during growth.

The amount of carbon dioxide dissolved in an aqueous plant growth solution open to the atmosphere will eventually reach an equilibrium value with atmospheric carbon dioxide. The exact quantum of dissolved carbon dioxide, and its form (for example as dissolved gas, carbonic acid, bicarbonate ions or carbonate ions), is dependent on a number of factors including the temperature and pH of the aqueous plant growth solution, and the nature and concentration of the various salt species dissolved in the aqueous plant growth solution.

However, for any given combination of carbon dioxide concentration, pH and dissolved salts in an aqueous plant growth solution, the time that it takes before the levels of dissolved carbon dioxide is substantially at equilibrium with the atmosphere is determined by the surface area of the interface between the aqueous and gas phases.

Therefore, if carbon dioxide gas is exposed to an aqueous plant growth solution, the rate that carbon dioxide will dissolve into the aqueous plant growth solution will be a function of the surface area of aqueous plant growth solution exposed to carbon dioxide. It will also be proportional to the pressure of carbon dioxide. Therefore, by exposing, the aqueous plant growth solution to extremely fine bubbles of carbon dioxide, the surface area of carbon dioxide exposed to the aqueous plant growth solution is very large and the dissolution of carbon dioxide is very rapid. This effect can be increased by increasing the pressure of the carbon dioxide. Thus a large volume of carbon dioxide can be rapidly dissolved into a plant growth solution via introducing small high pressure bubbles of carbon dioxide into the plant growth solution.

Furthermore, if a plant growth solution which contains dissolved carbon dioxide in excess of the atmospheric equilibrium value is used in a system with a small interface between the plant growth solution and the atmosphere (such as a closed hydroponics system, semi-closed fertigation system or open drip or watering system with preferably large droplets), then the surface area of the plant growth solution so exposed to the atmosphere is small. This will result in slow evolution of the dissolved carbon dioxide out of the plant growth solution and equilibrium between the levels of carbon dioxide in the plant growth solution and the atmosphere will be attained very slowly. Thus, the carbon dioxide will stay in the aqueous plant growth solution for a substantial amount of time.

It can thus be readily understood that if carbon dioxide gas under pressure is dissolved into a plant growth solution (for example using a sintered sparger which produces micron sized bubbles), then the carbon dioxide will dissolve into the solution more or less instantaneously. If such a carbon dioxide impregnated plant growth solution is managed such that it does not form a fine mist exposed to the atmosphere, but rather is introduced into watering system such as a closed hydroponics system, semi-closed fertigation system or open drip or spray watering system with large droplets, then the plant growth solution in that watering system will contain carbon dioxide at concentrations greater than the atmosphere, and will continue containing such elevated levels of carbon dioxide for a substantial amount of time, thereby enabling carriage of the carbon dioxide to plant roots for uptake by those plant roots.

Growers may have a preference for greater or lesser amounts of carbon dioxide in the plant growth solutions used to grow crops, depending on their plans and schedules to deliver produce to market. By using a system of nutrient mixture concentrates, which include conventional typical hydroponic nutrient mixtures and the alternative salt nutrient mixtures of the present invention, and blending such mixtures into plant growth solutions in ratios as they see fit, the amount of carbon dioxide dissolved in the final plant growth solution used in a watering system can range from zero to up to 5,000 parts per million.

The present invention therefore provides a plant growth solution comprising:
a) an alternative salt nutrient mixture wherein one or more of the following nutrients is present as a carbonate: nitrogen (eg ammonium), potassium, calcium, magnesium, iron, manganese, boron, zinc or copper and/or wherein one or more of the following nutrients is present as a nitrate: nitrogen (eg ammonium), potassium, calcium magnesium, iron, manganese, boron, zinc or copper;
b) an aqueous carrier; and
c) dissolved carbon dioxide.

The pH of the plant growth solution obtained from mixing alternative salt nutrient mixture Parts A and B (and C) with an aqueous carrier is generally higher than is optimal for hydroponic plant growth. Such a high pH would ordinarily cause precipitation of trace elements such as copper and zinc (whose carbonate salts are relatively insoluble). However, dissolution of carbon dioxide in the plant growth solution reduces the pH to the level desired by the grower, but preferably to between about 5.2 and 7.0; 5.5 and 6.5; 6.0 and 6.6, 5.8 and 6.7, 6.0 to 6.5, or more preferably to approximately 6.2, 6.3 or 6.4. Most preferably the pH is 6.3. By dissolving carbon dioxide in the plant growth solution of the present invention, it becomes possible to incorporate a large amount of dissolved inorganic carbon into the plant growth solution for use in a watering system such as a hydroponics system. Because the approximate optimal pH of the plant growth solution is typically the same as the bicarbonate dissociation constant (pKa 6.3), of the dissolved carbon dioxide which is hydrated, half is in the form of bicarbonate and half is carbonic acid. As such, no carbonates are present and thus trace elements are not locked up as insoluble carbonates.

It is believed that the net effect of delivering carbon dioxide in a plant growth solution is comparable to the nature and extent of growth stimulation provided by enhancing atmospheric carbon dioxide.

It has been found in greenhouses and glasshouses where carbon dioxide is added to the atmosphere, there is an optimum concentration of carbon dioxide for each different crop. This amount may vary at different times of the day and the year as solar intensity increases and decreases, and may vary due to the specific developmental stage of the plants being grown.

The plant growth solution comprising an alternative salt nutrient mixture of the present invention allows for the easy and convenient increase or decrease in the amount of total inorganic carbon dissolved in the plant growth solution for use in a variety of watering systems. As a result of the delivery of dissolved inorganic carbon to the plant growth solution in a number of ways, it becomes possible to have very precise control over the total amount of dissolved inorganic carbon in solution, whilst maintaining optimal pH and nutrient concentrations in any or all of closed watering systems, semi-closed watering systems and open watering systems.

Preferably, the plant growth solution is maintained at a pH of between about 5.2 and 7.0. More preferably, the pH is maintained between about 5.5 and 6.5, most preferably between about 6.0 and 6.6. Most preferably, the pH is maintained at about 6.3±1, or 6.3. These pHs are preferred in any or all of closed watering systems, semi-closed watering systems and open watering systems.

The present invention also provides a closed watering system (such as hydroponics watering system) for the growth of plants, the closed watering system comprising: a plant growth solution comprising an alternative salt nutrient mixture wherein some or all the nutrients typically provided in the form of sulphates are instead provided in the form of other mineral salts. Preferably, the mineral salts are carbonates and/or nitrates. The levels of inorganic carbon and the pH of plant growth solution comprising an alternative salt nutrient mixture is adjusted by dissolving carbon dioxide in the plant growth solution.

There is therefore provided a closed watering system for the growth of plants, the closed watering system comprising: a plant growth solution comprising an alternative salt nutrient mixture wherein one or more of the following nutrients: nitrogen (eg ammonium), potassium, calcium, magnesium, iron, manganese, boron, zinc or copper is present as a carbonate. Preferably, the alternative salt nutrient mixture provides one or more of the following nutrients as a carbonate: magnesium, potassium, manganese, zinc or copper. Most preferably, the alternative salt nutrient mixture comprises magnesium and/or potassium as a carbonate.

There is also provided a closed watering system for the growth of plants, the closed watering system comprising: a plant growth solution comprising an alternative salt nutrient mixture wherein one or more of the following nutrients: nitrogen (eg ammonium), potassium, calcium, magnesium, iron, manganese, boron, zinc or copper is present as a nitrate. Preferably, the alternative salt nutrient mixture provides one or more of the following nutrients as a nitrate: magnesium, potassium, manganese, zinc or copper. Most preferably, the alternative salt nutrient mixture comprises magnesium as a nitrate.

The present invention preferably provides a closed watering system for the growth of plants, the closed watering system comprising: a plant growth solution comprising an alternative salt nutrient mixture comprising potassium carbonate and magnesium nitrate.

When a closed watering system such as a hydroponics system is set up using the plant growth solution comprising an alternative salt nutrient mixture of the present invention, there may be a build-up of precipitated carbonate salts on the jets and other components of the watering system. This issue may be overcome by providing the alternative salt nutrient mixture in three Parts. The three Parts are preferably mixed to form the plant growth solution only once they have been diluted in the aqueous carrier of the closed watering system. Preferably, if the alternative salt nutrient mixture is provided in three Parts, then Part C containing potassium carbonate is added to the plant growth solution last and immediately before dissolving carbon dioxide gas in the plant growth solution.

The present invention also provides a semi-closed watering system for the growth of plants, the semi-closed watering system comprising: a plant growth solution comprising an alternative salt nutrient mixture wherein the nutrients typically provided in the form of sulphates are instead provided in the form of other mineral salts. Preferably, the mineral salts are carbonates and/or nitrates. The levels of carbon and the pH of the plant growth solution comprising an alternative salt nutrient mixture is adjusted by dissolving carbon dioxide in the plant growth solution.

There is therefore provided a semi-closed watering system for the growth of plants, the semi-closed watering system comprising: a plant growth solution comprising an alternative salt nutrient mixture wherein one or more of the following nutrients: nitrogen (eg ammonium), potassium, calcium, magnesium, iron, manganese, boron, zinc or copper is present as a carbonate. Preferably, the alternative salt, nutrient mixture provides one or more of the following nutrients as a carbonate: magnesium, potassium, manganese, zinc or copper. Most preferably, the alternative salt nutrient mixture comprises magnesium and/or potassium as a carbonate.

There is also provided a semi-closed watering system for the growth of plants, the semi-closed watering system comprising: a plant growth solution comprising an alternative salt nutrient mixture wherein one or more of the following nutrients: nitrogen (eg ammonium), potassium, calcium, magnesium, iron, manganese, boron, zinc or copper is present as a nitrate. Preferably, the alternative salt nutrient mixture provides one or more of the following nutrients as a nitrate: magnesium, potassium, manganese, zinc or copper. Most preferably, the alternative salt nutrient mixture comprises magnesium as a nitrate.

The present invention preferably provides a semi-closed watering system for the growth of plants, the semi-closed watering system comprising: a plant growth solution comprising an alternative salt nutrient mixture comprising potassium carbonate and magnesium nitrate.

Preferably the semi-closed watering system is a fertigation system, such as systems comprising a plastic mulch film (or other mulch type) on top of outdoor growth beds which are irrigated by drip tubing.

The present invention also provides an open watering system for the growth of plants, the open watering system comprising: a plant growth solution comprising an alternative salt nutrient mixture wherein the nutrients typically provided in the form of sulphates are instead provided in the form of other mineral salts. Preferably, the mineral salts are carbonates and/or nitrates. The levels of carbon and the pH of the plant growth solution comprising an alternative salt nutrient mixture is adjusted by dissolving carbon dioxide in the plant growth solution.

There is therefore provided an open watering system for the growth of plants, the open watering system comprising: a plant growth solution comprising an alternative salt nutrient mixture wherein one or more of the following nutrients: nitrogen (eg ammonium), potassium, calcium, magnesium, iron, manganese, boron, zinc or copper is present as a carbonate. Preferably, the alternative salt nutrient mixture provides one or more of the following nutrients as a carbonate: magnesium, potassium, manganese, zinc or copper. Most preferably, the alternative salt nutrient mixture comprises magnesium and/or potassium as a carbonate.

There is also provided an open watering system for the growth of plants, the open watering system comprising: a plant growth solution comprising an alternative salt nutrient mixture wherein one or more of the following nutrients: nitrogen (eg ammonium), potassium, calcium, magnesium, iron, manganese, boron, zinc or copper is present as a nitrate. Preferably, the alternative salt nutrient mixture provides one or more of the following nutrients as a nitrate: magnesium, potassium, manganese, zinc or copper. Most preferably, the alternative salt nutrient mixture comprises magnesium as a nitrate.

The present invention preferably provides an open watering system for the growth of plants, the open watering system comprising: a plant growth solution comprising an alternative salt nutrient mixture comprising potassium carbonate and magnesium nitrate.

Preferably the open watering system is the irrigation or spray watering of crops in broad acre fields or open fields.

The present invention further provides a method of increasing the carbon dioxide available for plant growth comprising the steps of:
  a) providing a plant growth solution comprising an alternative salt nutrient mixture comprising nutrients typically provided in the form of sulphates in the form of other mineral salts; and,
  b) dissolving carbon dioxide in the plant growth solution.

Preferably, the invention provides method of increasing carbon dioxide available for plant growth comprising the steps of:
  a) providing a plant growth solution comprising an alternative salt nutrient wherein one or more of the following nutrients is present as a carbonate: nitrogen (eg ammonium), potassium, calcium, magnesium, iron, manganese, boron, zinc or copper and/or one or more of the following nutrients is present as a nitrate: nitrogen (eg ammonium), potassium, calcium, magnesium, iron, manganese, boron, zinc or copper; and
  b) dissolving carbon dioxide in the plant growth solution.

The present invention further provides a method of using a plant growth solution comprising an alternative salt nutrient mixture wherein the nutrients typically provided in the form of sulphates are instead provided in the form of other mineral salts, the method comprising the steps of:
  a) circulating the plant growth solution comprising an alternative salt nutrient mixture through a hydroponics system.

The present invention further provides a method of using a plant growth solution comprising an alternative salt nutrient mixture wherein the nutrients typically provided in the form of sulphates are instead provided in the form of other mineral salts, the method comprising the steps of:
  a) circulating the plant growth solution comprising an, alternative salt nutrient mixture through a semi-closed watering system.

The present invention further provides a method of using a plant growth solution comprising an alternative salt nutrient mixture wherein the nutrients typically provided in the form of sulphates are instead provided in the form of other mineral salts, the method comprising the steps of:
  a) circulating the plant growth solution comprising an alternative salt nutrient mixture through an open watering system.

In the above methods, the mineral salts in the alternative salt nutrient mixture are preferably carbonates and/or nitrates.

Preferably, one or more of the following nutrients is present as a carbonate: nitrogen (eg ammonium), potassium, calcium, magnesium, iron, manganese, boron, zinc or copper. Preferably, the alternative salt nutrient mixture provides one or more of the following nutrients as a carbonate: magnesium, potassium, manganese, zinc or copper. Most preferably, the alternative salt nutrient, mixture comprises magnesium and/or potassium as a carbonate.

Preferably one or more of the following nutrients is present as a nitrate: nitrogen (eg ammonium), potassium, calcium, magnesium, iron, manganese, boron, zinc or copper. Preferably, the alternative salt nutrient mixture provides one or more of the following nutrients as a nitrate: magnesium, potassium, manganese, zinc or copper. Most preferably, the alternative salt nutrient mixture comprises magnesium as a nitrate.

General

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in the specification, individually or collectively and any and all combinations or any two or more of the steps or features.

The present invention is not to be limited in scope by the specific embodiments described herein, which are intended for the purpose of exemplification only. Functionally equivalent products, compositions and methods are clearly within the scope of the invention as described herein.

The entire disclosures of all publications (including patents, patent applications, journal articles, laboratory manuals, books, or other documents) cited herein are hereby incorporated by reference. No admission is made that any of the references constitute prior art or are part of the common general knowledge of those working in the field to which this invention relates.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness.

Any manufacturer's instructions, descriptions, product specifications, and product sheets for any products mentioned herein or in any document incorporated by reference herein, are hereby incorporated herein by reference, and may be employed in the practice of the invention.

As used herein the term "derived" and "derived from" shall be taken to indicate that a specific integer may be obtained from a particular source albeit not necessarily directly from that source.

As used herein, the singular forms "an" and "the" include plural references unless the context clearly dictates otherwise.

Throughout this specification, unless the context requires otherwise, the word "comprise", or variations such as "comprises" or "comprising", will be understood to imply the inclusion of a stated integer or group of integers but not the exclusion of any other integer or group of integers.

Other than in the operating example, or where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the specification and claims are approximations that may vary depending upon the desired properties sought to be obtained by the present invention. Hence "about 80%" means "about 80%" and also "80%". At the very least, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value; however, inherently contains certain errors necessarily resulting from the standard deviation found in their respective testing measurements Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

The following examples serve to more fully describe the manner of using the above-described invention, as well as to set forth the best modes contemplated for carrying out various aspects of the invention. It is understood that these methods in no way serve to limit the true scope of this invention, but rather are presented for illustrative purposes.

EXAMPLES

Example 1

Solubility of Carbon in $CO_2$ Plant Growth Solution

The effect of carbon dioxide gassing on the pH of plant growth solutions was investigated by sparging industrial grade carbon dioxide through two litres of either a typical plant growth solution or a plant growth solution containing an alternative salt nutrient mixture of the present invention wherein the nutrients typically provided in the form of sulphates are instead mostly provided in the form of other mineral salts. The plant growth solutions were made up as follows:

| Component (g/L) | Typical | $CO_2$ |
| --- | --- | --- |
| Calcium Nitrate | 150 | 150 |
| Potassium Nitrate | 60 | 31 |
| Ammonium Nitrate | 18 | 18 |
| Monopotassium Phosphate | 45 | 45 |
| Magnesium Sulphate | 85 | 45 |
| Potassium carbonate | 55 | 0 |
| Potassium Sulphate | 0 | 67 |
| Magnesium Nitrate | 0 | 40 |

Figure 4:
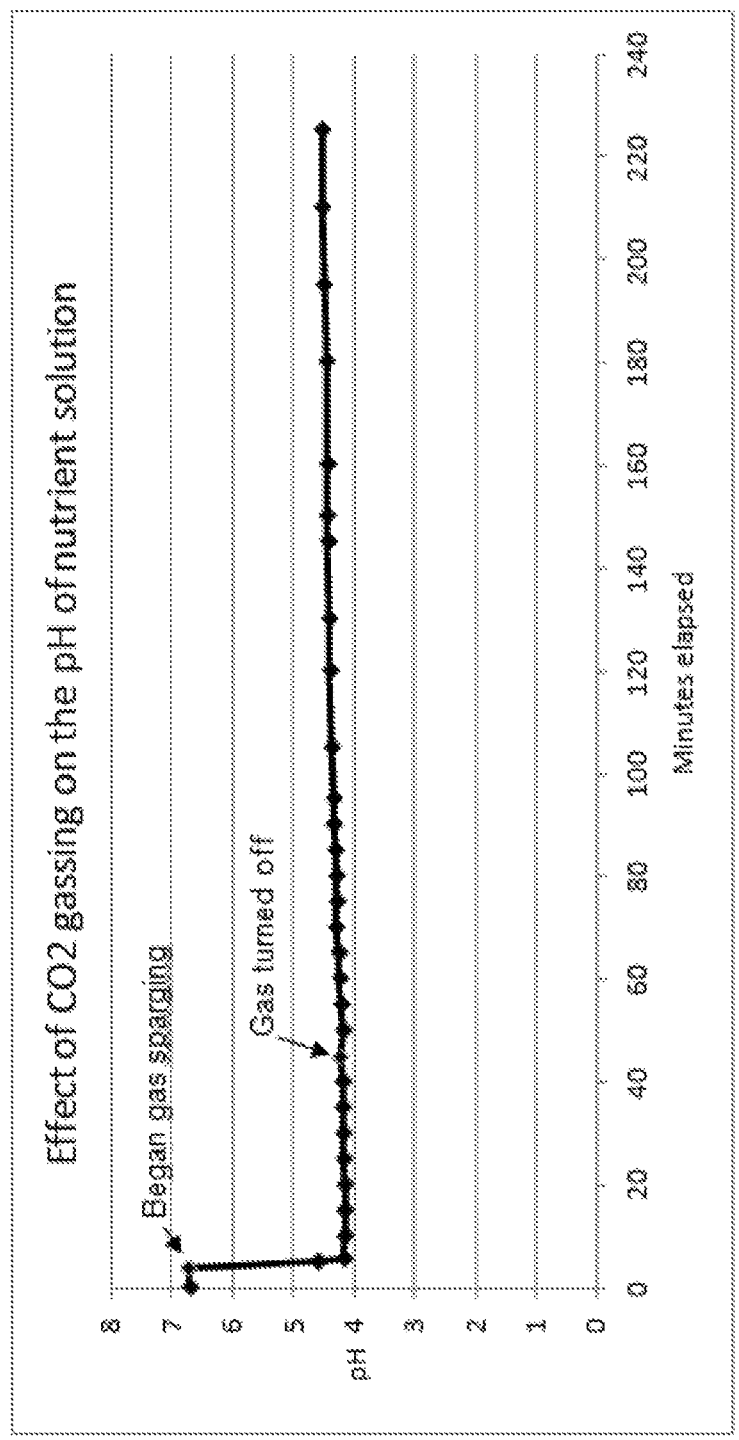
FIG. 4 is a graph of the change in pH when carbon dioxide is introduced into a plant growth solution containing a typical nutrient mixture. As the dissolved carbon dioxide levels reach equilibrium, the carbonic acid formed means the pH of the solution drops to 4 which is not conducive to optimal plant growth.
Figure 5:
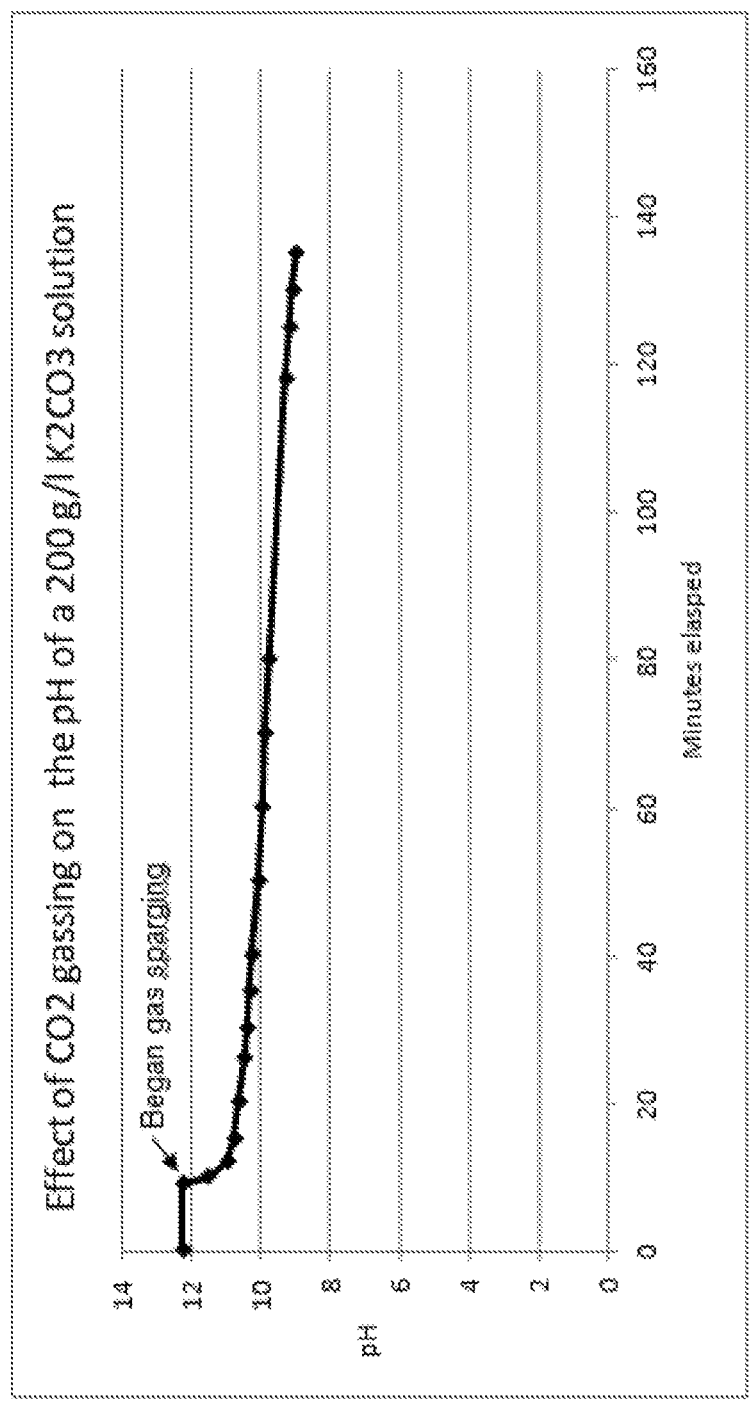
FIG. 5 is a graph of the change in pH when carbon dioxide is introduced into a plant growth solution containing, potassium carbonate, a component of the alternative salt nutrient mixture of the present invention. The dissolved carbon dioxide levels reach equilibrium and the pH of the solution is at about 8.3, which indicates additional carbon dioxide has dissolved into the solution thereby forming approximately equal parts of carbonate and bicarbonate ions.
Figure 6:
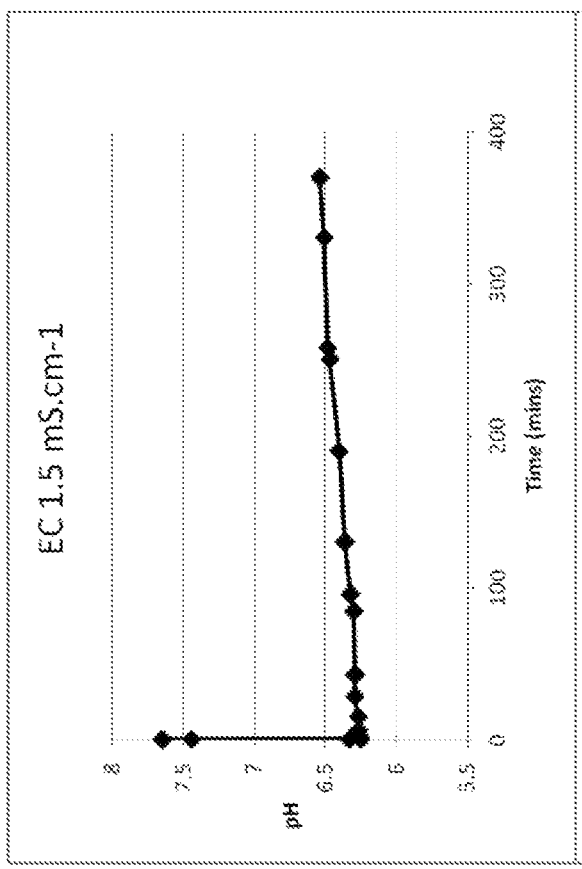
FIG. 6 is a graph of the change in pH when carbon dioxide is introduced into a plant growth solution containing the alternative salt nutrient mixture of the present invention at a low to moderate concentration of total nutrients. The carbon dioxide levels reach equilibrium at pH 6.3 and maintained a similar pH for about 6 hours. This is a preferred pH for plant growth.
Figure 7:
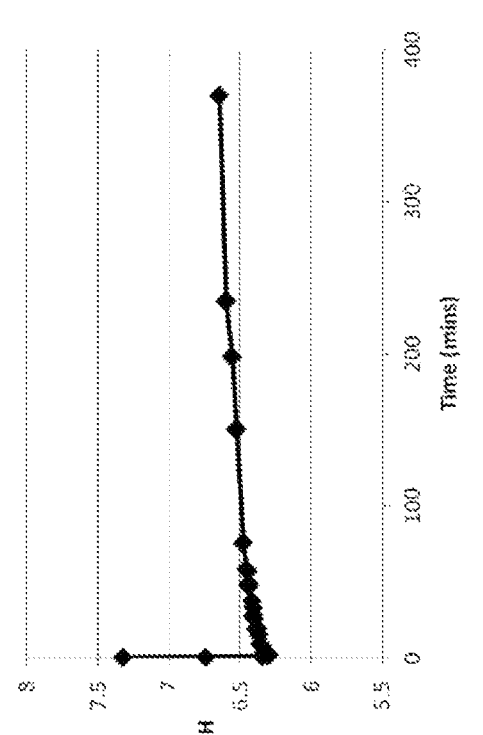
FIG. 7 is a graph of the change in pH when carbon dioxide is introduced into a plant growth solution containing the alternative salt nutrient mixture of the present invention at a medium to high concentration of total nutrients. The carbon dioxide levels reach equilibrium at pH 6.3 and maintained a similar pH for about 6 hours. This is a preferred pH for plant growth.
Figure 8:
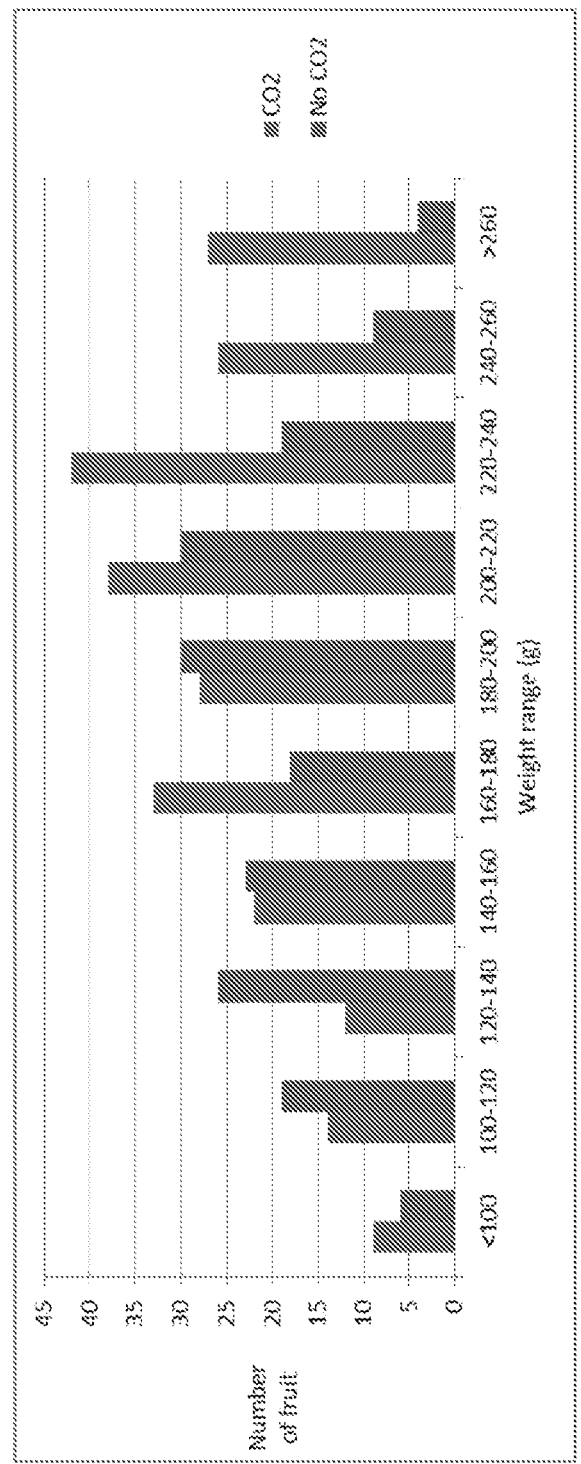
FIG. 8 is a graph of the weight range of capsicums grown in a glass house in the presence of a typical nutrient solution compared to the weight range of capsicums grown in the plant growth solution comprising an alternative salt nutrient mixture and dissolved carbon dioxide of the present invention.

The carbon dioxide was introduced via an aquarium stone. The gas was sparged for 40 minutes, then turned off. FIGS. 4, 6 and 7 show that, whilst both a typical plant growth solution (FIG. 4) and a plant growth solution containing an alternative salt nutrient mixture of the present invention (FIGS. 6 and 7) reach an equilibrium of carbon dioxide content and pH, the pH of the typical plant growth solution is about 4.5, unsuitable for optimal plant growth. In contrast, the plant growth solution containing a nutrient mixture of the present invention reached an equilibrium of carbon dioxide content and pH, with the pH being about 6.3, which is suitable for plant growth. This equilibrium was maintained for at least 140 minutes.

The pH of the solution was measured with a calibrated pH probe before gassing began, then at regular intervals until a pH equilibrium was reached.

Experiments were carried out using two different concentrations of the alternative salt nutrient mixture of the present invention (FIG. 6 and FIG. 7). The nutrient solution was made up and then added to reverse osmosis purified water either in the concentration shown above, or at half that strength. Carbon dioxide gas was bubbled through the solution using an aquarium stone. The pH of the solutions dropped to 6.3 rapidly, at which point the gas was switched off. The pH was recorded for the following six hours.

It can be seen that a plant growth solution according to the present invention can hold carbon dioxide is solution for a sufficient amount of time to administer the plant growth solution to plants using drippers or sprinklers.

Example 2

Capsicum Growth Using $CO_2$ Plant Growth Solution

The growth of capsicums in a greenhouse, using rockwool as a growth substrate, with each plant irrigated by a drip sprinkler was measured over a seven week period, with plants being, grown in the presence of either a plant growth solution comprising an alternative salt nutrient mixture of the present invention ($CO_2$) or a typical nutrient mixture (Typical); having the following formulation:

| Component (g/L) | Typical | $CO_2$ |
|---|---|---|
| Calcium Nitrate | 188 | 188 |
| Potassium Nitrate | 184 | 167 |
| Monopotassium Phosphate | 40 | 40 |
| Magnesium Sulphate | 90 | 70 |
| Potassium carbonate | — | 40 |
| Potassium Sulphate | 40 | — |
| Magnesium Nitrate | — | 23 |

The trace element salts used in the Typical and $CO_2$ nutrient mixtures were identical. Both nutrient solutions were maintained at an electrical conductivity of 1.5 mS cm$^{-1}$.

The greenhouses contained an amount of atmospheric carbon dioxide which in the early morning was typically 380 parts per million, and by mid-day typically had dropped to 300 parts per million. The plant growth solution comprising an alternative salt nutrient mixture of the present invention, contained 1200 parts per million of dissolved inorganic carbon, introduced by using potassium carbonate in the nutrient mixture and dissolving carbon dioxide gas into the plant growth solution until the pH was 6.3.

During commercial capsicum growing, plants are continuously pruned and managed, with the mature leaves being left, but new shoots being pruned off to leave a few flowers at each "node" (branch where new leaves and flowers originate). The plants used were trained to grow two stems each.

Each week, the ripe fruit from each plant were harvested and weighted (Table 5, FIG. 6). Note that the first harvest, 62 days after seeds were sown, was of green fruit. This practice of removing the first green fruit prematurely regulates subsequent growth and development of the vine. The results show that the number of fruits harvested was increased by 88% when plants are grown in the presence of a nutrient mixture of the present invention. The weight of harvested fruit was also increased by 111%. As the premium price for capsicums is obtained from large heavy fruit, growth of plants in the nutrient mixture of the present invention advantageously delivers an increase in premium fruit product (Table 6).

TABLE 5

Yield of capsicums

| | Weekly Yield | | | | Cumulative yield | | | | Difference | Difference |
|---|---|---|---|---|---|---|---|---|---|---|
| | $CO_2$ | | Control | | $CO_2$ | | Control | | | |
| Days post seed planting | # of fruit | Weight (g) | # of fruit | Weight (g) | # of fruit | Weight (g) | # of fruit | Weight (g) | Number (%) | Weight (%) |
| 62 | 83 | 13293 | 83 | 12391 | | | | | | |
| 72 | 3 | 607 | 0 | 0 | | | | | | |
| 80 | 8 | 1466 | 14 | 2490 | 11 | 2074 | 14 | 2490 | −79 | −83 |
| 86 | 33 | 7014 | 18 | 3535 | 44 | 9087 | 32 | 6026 | 138 | 151 |
| 93 | 27 | 6143 | 26 | 5341 | 71 | 15231 | 58 | 11366 | 122 | 134 |
| 100 | 18 | 3926 | 8 | 1426 | 89 | 19156 | 66 | 12792 | 135 | 150 |
| 107 | 37 | 8041 | 17 | 3341 | 126 | 27197 | 83 | 16133 | 152 | 169 |
| 114 | 56 | 12394 | 14 | 2655 | 182 | 39592 | 97 | 18788 | 188 | 211 |

TABLE 6

Number of capsicum fruit in each weight class

| Weight class | $CO_2$ | Control |
|---|---|---|
| <100 | 9 | 6 |
| 100-120 | 14 | 19 |
| 120-140 | 12 | 26 |
| 140-160 | 22 | 23 |
| 160-180 | 33 | 18 |
| 180-200 | 28 | 30 |
| 200-220 | 38 | 30 |
| 220-240 | 42 | 19 |
| 240-260 | 26 | 9 |
| >260 | 27 | 4 |

Example 3

Lettuce Growth Using $CO_2$ Plant Growth Solution

"Summer Gold" a crisphead variety lettuce were grown in the open air using a Nutrient Film Technique (NFT). One (Control) NFT bed was operated using "Typical" hydroponic nutrients. Another ($CO_2$) NFT bed was operated using the modified nutrient formulae. Nutrient concentrates were diluted to produce and Electrical Conductivity of 1.0 mS cm$^{-1}$ in the NFT solution.

| Lettuce Component (g/L) | Typical | $CO_2$ |
|---|---|---|
| Calcium Nitrate | 150 | 150 |
| Potassium Nitrate | 60 | 31 |

-continued

| Lettuce Component (g/L) | Typical | $CO_2$ |
|---|---|---|
| Ammonium Nitrate | 18 | 18 |
| Monopotassium Phosphate | 45 | 44 |
| Magnesium Sulphate | 85 | 25 |
| Potassium carbonate | 0 | 67 |
| Potassium Sulphate | 55 | 0 |
| Magnesium Nitrate | 0 | 40 |

Identical trace element salts were added to each treatment.

Nutrient solutions were contained in 200 L plastic drums. A small aquarium pump was used in each drum to deliver 1 liter per minute to each of 6 PVC channels in each NFT bed. Channels were 12 m long, supported on steel frames, and had a slope of 1:50. Water draining from the end was collected into the nutrient drum. The CO2 treated bed has CO2 injected into the watering line immediately after the pump, with the application volume regulated by a solenoid controlled by an in line pH electrode. Total dissolved inorganic carbon was 800 ppm.

Lettuce seeds were germinated in plastic pots containing a perlite medium. At the start of the trial, seedlings were placed in the NFT gullies. Fresh weights of lettuce plants were measured every week from the third week of planting by removing 20 plants from each bed, and cutting the entire plant from the perlite pot, then weighing each plant.

Figure 9:
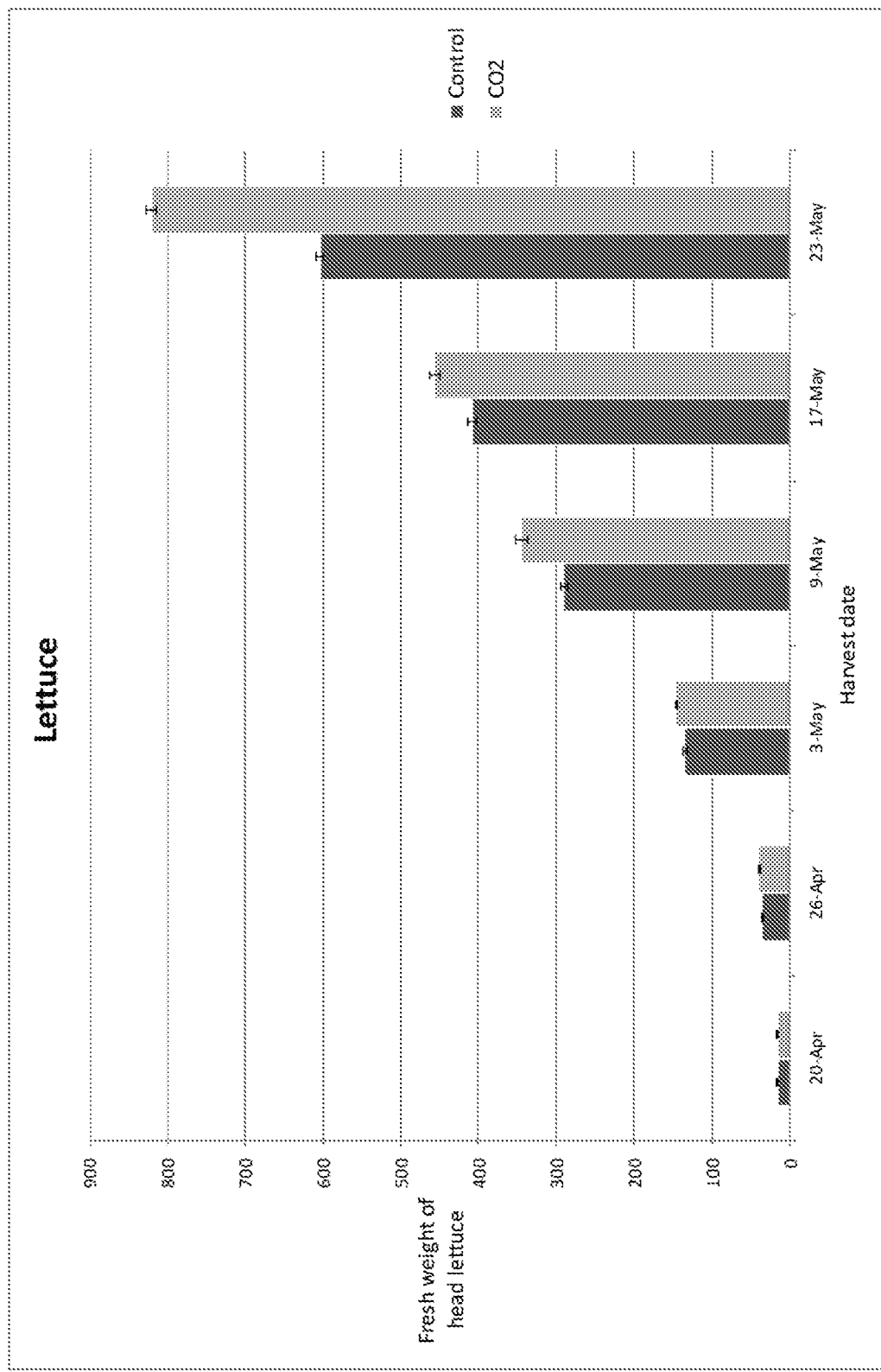
FIG. 9 is a graph of the growth of lettuce grown in a glass house in the presence of a typical nutrient solution compared to the growth of lettuce grown in the plant growth solution comprising an alternative salt nutrient mixture and dissolved carbon dioxide of the present invention.

As shown in FIG. 9, the weight of CO2 treated lettuce became significantly higher by week 6, and by full harvest at week 8, treated lettuce were 33% heavier.

Example 4

English Spinach Growth Using $CO_2$ Plant Growth Solution

English Spinach was grown in the same NFT system as Example 3. One (Control) NFT bed was operated using "Typical" hydroponic nutrients. Three ($CO_2$) NFT beds were operated using the modified nutrient formulae. Nutrient concentrates were diluted to produce an Electrical Conductivity of 1.5 mS cm$^{-1}$. One $CO_2$ bed ($CO_2$2) was run at an EC of 1.25, and another ($CO_2$3) was run at an EC of 1.75. In the $CO_2$ treatments, total dissolved inorganic carbon was 1200 ppm.

| Spinach Component (g/L) | Typical | $CO_2$ |
|---|---|---|
| Calcium Nitrate | 150 | 150 |
| Potassium Nitrate | 120 | 77 |
| Ammonium Nitrate | 12.5 | 12.5 |
| Monopotassium Phosphate | 30 | 30 |
| Magnesium Sulphate | 100 | 53 |
| Potassium carbonate | 0 | 61 |
| Potassium Sulphate | 42.5 | 0 |
| Magnesium Nitrate | 0 | 52 |

At 3, 5 and 6 weeks after placing seedlings on the NET beds. 20 cups from each treatment were removed and the whole tops was cut and weighed.

Figure 10:
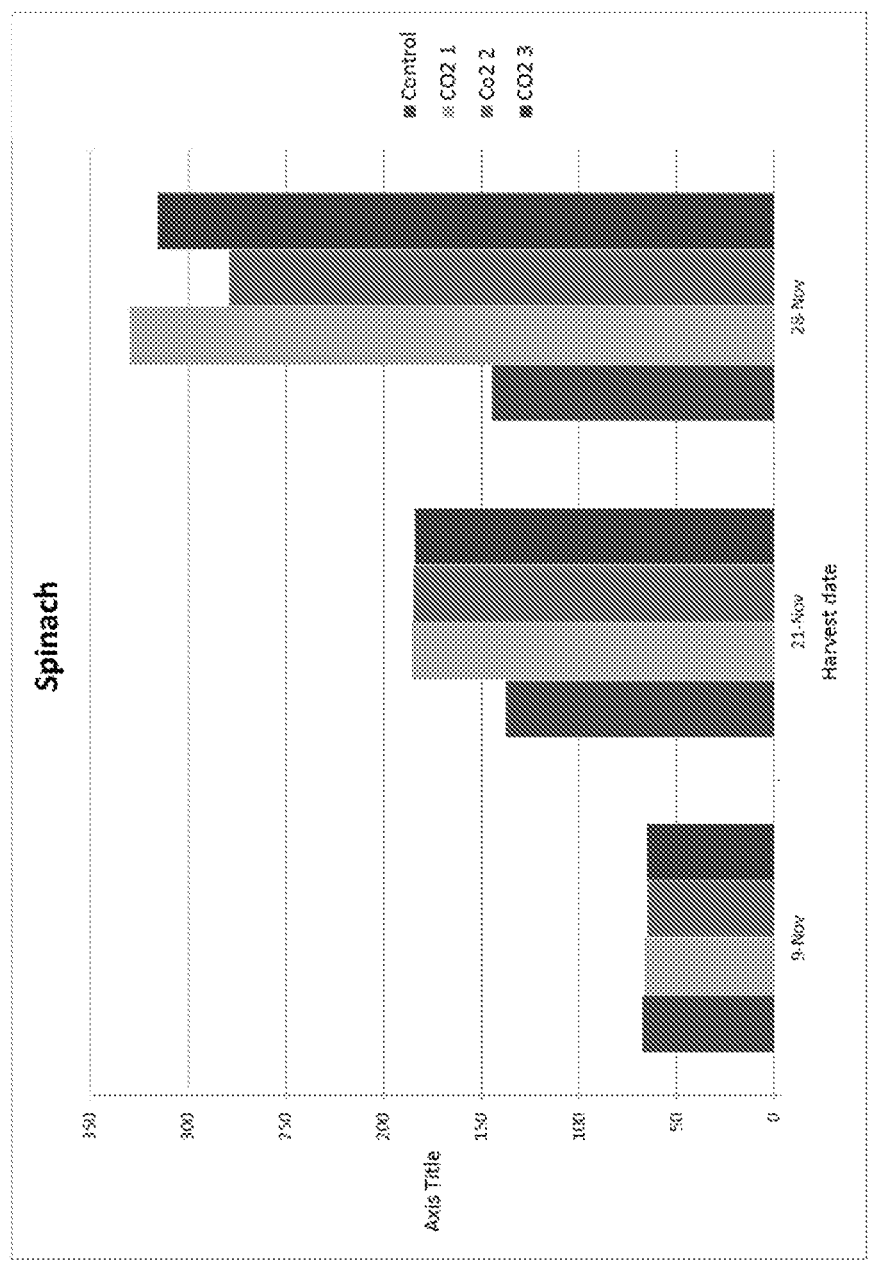
FIG. 10 is a graph of the growth of English spinach grown in a glass house in the presence of a typical nutrient solution compared to the growth of English spinach grown in the plant growth solution comprising an alternative salt nutrient mixture and dissolved carbon dioxide of the present invention.

FIG. 10 shows that by week 4, all $CO_2$ treated beds were 34% heavier, whereas by week 5, spinach was between 95-128% heavier than controls.

Example 5

Tomato Growth Using $CO_2$ Plant Growth Solution

Tomato of the F1 "Firestick" variety were grown in a greenhouse using, an NFT method.

Nutrient solutions were contained in 200 L plastic drums sunk into the ground. A small aquarium pump was used in each drum to deliver 1 liter per minute to each of 2 NFT channels without $CO_2$ treatment and two with $CO_2$ treatment. Channels were rectangular (100×50 mm) PVC 12 m long, lying on the greenhouse floor, and had a slope of 1:50. Water drained from the ends into the nutrient drum2. The $CO_2$ treated gullies has $CO_2$ injected into the watering line immediately after the pump, with the application volume regulated by a solenoid controlled by an in line pH electrode. Total dissolved inorganic carbon in the $CO_2$ treated gullies was 1500 ppm.

| Tomato Component (g/L) | Typical | $CO_2$ |
|---|---|---|
| Calcium Nitrate | 150 | 150 |
| Potassium Nitrate | 172 | 105 |
| Ammonium Nitrate | 39 | 39 |
| Monopotassium Phosphate | 72.8 | 72.8 |
| Magnesium Sulphate | 130 | 70 |
| Potassium carbonate | 0 | 53 |
| Potassium Sulphate | 10.4 | 0 |
| Magnesium Nitrate | 0 | 63 |

The System was operated at an EC of 4.5 mS cm$^{-1}$ for both "Typical" controls and $CO_2$ treated systems. Tomato plants were trained as single vines, and had lateral shoots pruned weekly. Flowering trusses began growing after 7 weeks, and at 10 weeks, ripe tomatoes were harvested, weighed and were assessed for quality, by dividing each tomato into one of 4 groups: Deformed, Small or Split, Medium, and Large.

Figure 11:
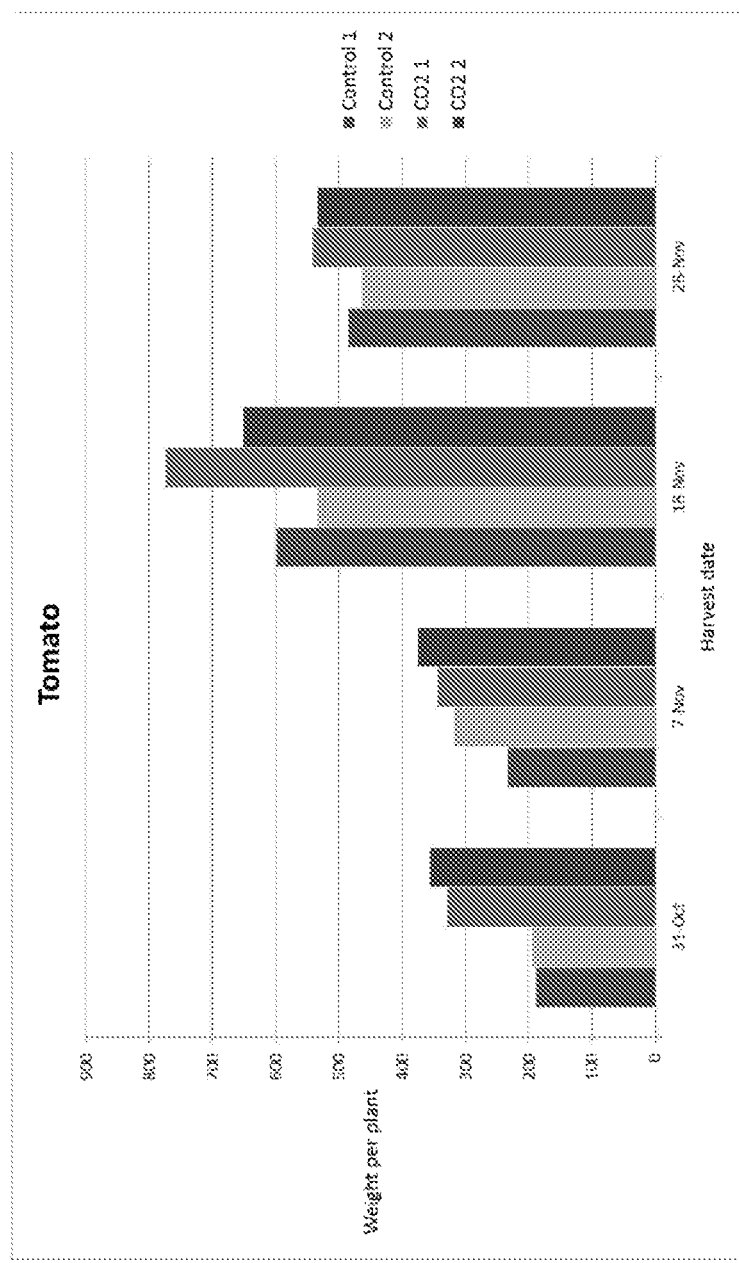
FIG. 11 is a graph of the weight of tomatoes grown in a glass house in the presence of a typical nutrient solution compared to the weight of tomatoes grown in the plant growth solution comprising an alternative salt nutrient mixture and dissolved carbon dioxide of the present invention.
Figure 12:
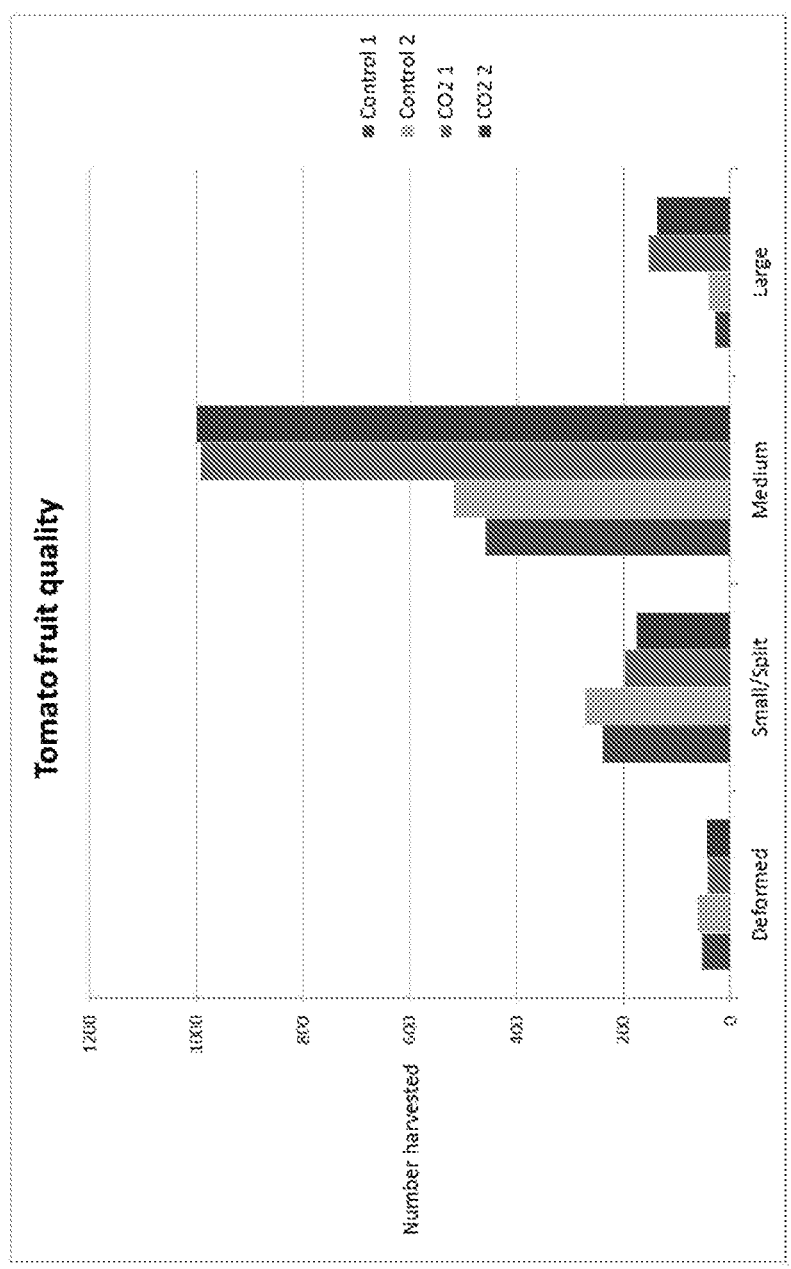
FIG. 12 is a graph of the quality of tomatoes grown in a glass house in the presence of a typical nutrient solution compared to the quality of tomatoes grown in the plant growth solution comprising an alternative salt nutrient mixture and dissolved carbon dioxide of the present invention.

The results in FIG. 11 show that at each harvest, $CO_2$ treatment resulted in typically 30% increased tomato weight. FIG. 12 shows that over the growth trial, the number of small or split tomatoes was less with $CO_2$ treatment, and the number of medium and larger tomatoes was very much higher.

The invention claimed is:

1. An alternative salt nutrient mixture for plant growth, comprising:
    i. 1 g/L to 250 g/L potassium carbonate;
    ii. 30 g/L to 100 g/L magnesium nitrate;
    iii. ammonium carbonate;
    iv. calcium carbonate;
    v. manganese carbonate;
    vi. one or more of magnesium carbonate, iron carbonate, zinc carbonate, and copper carbonate; and
    vii. one or more of ammonium nitrate, calcium nitrate, iron nitrate, manganese nitrate, zinc nitrate, and copper nitrate;
    such that when the alternative salt nutrient mixture and carbon dioxide are dissolved in an aqueous carrier to form a plant growth solution the pH remains between 5.2 and 7.0.

2. The alternative salt nutrient mixture of claim 1 for use in a watering system chosen from the following: a closed watering system, a semi-closed watering system or an open watering system.

3. A plant growth solution comprising:
a) an alternative salt nutrient mixture comprising:
  i. 1 g/L to 250 g/L potassium carbonate;
  ii. 30 g/L to 100 g/L magnesium nitrate;
  iii. ammonium carbonate;
  iv. calcium carbonate;
  v. manganese carbonate;
  vi. one or more of magnesium carbonate, iron carbonate, zinc carbonate, and copper carbonate; and
  vii. one or more of ammonium nitrate, calcium nitrate, iron nitrate, manganese nitrate, zinc nitrate, and copper nitrate;
b) an aqueous carrier; and
c) dissolved carbon dioxide
such that when the alternative salt nutrient mixture and the carbon dioxide are dissolved into the aqueous carrier to form the plant growth solution the pH of the plant growth solution remains between 5.2 and 7.0.

* * * * *

UNITED STATES PATENT AND TRADEMARK OFFICE
CERTIFICATE OF CORRECTION

PATENT NO. : 10,815,159 B2  
APPLICATION NO. : 15/573649  
DATED : October 27, 2020  
INVENTOR(S) : Peter James Keating Page 1 of 1

It is certified that error appears in the above-identified patent and that said Letters Patent is hereby corrected as shown below:

In the Claims

At Column 21, Line 14, In Claim 3, "carbon dioxide" should be -- carbon dioxide; --.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*